July 23, 1940.   R. S. DRUMMOND   2,208,572
METHOD AND MACHINE FOR FINISHING SURFACES
Filed Aug. 1, 1938   4 Sheets-Sheet 1

INVENTOR
ROBERT S. DRUMMOND
BY Whittemore, Hulbert
and Belknap
ATTORNEYS

July 23, 1940.  R. S. DRUMMOND  2,208,572
METHOD AND MACHINE FOR FINISHING SURFACES
Filed Aug. 1, 1938  4 Sheets-Sheet 2

INVENTOR
ROBERT S. DRUMMOND
BY Whittemore, Hulbert
and Belknap
ATTORNEYS

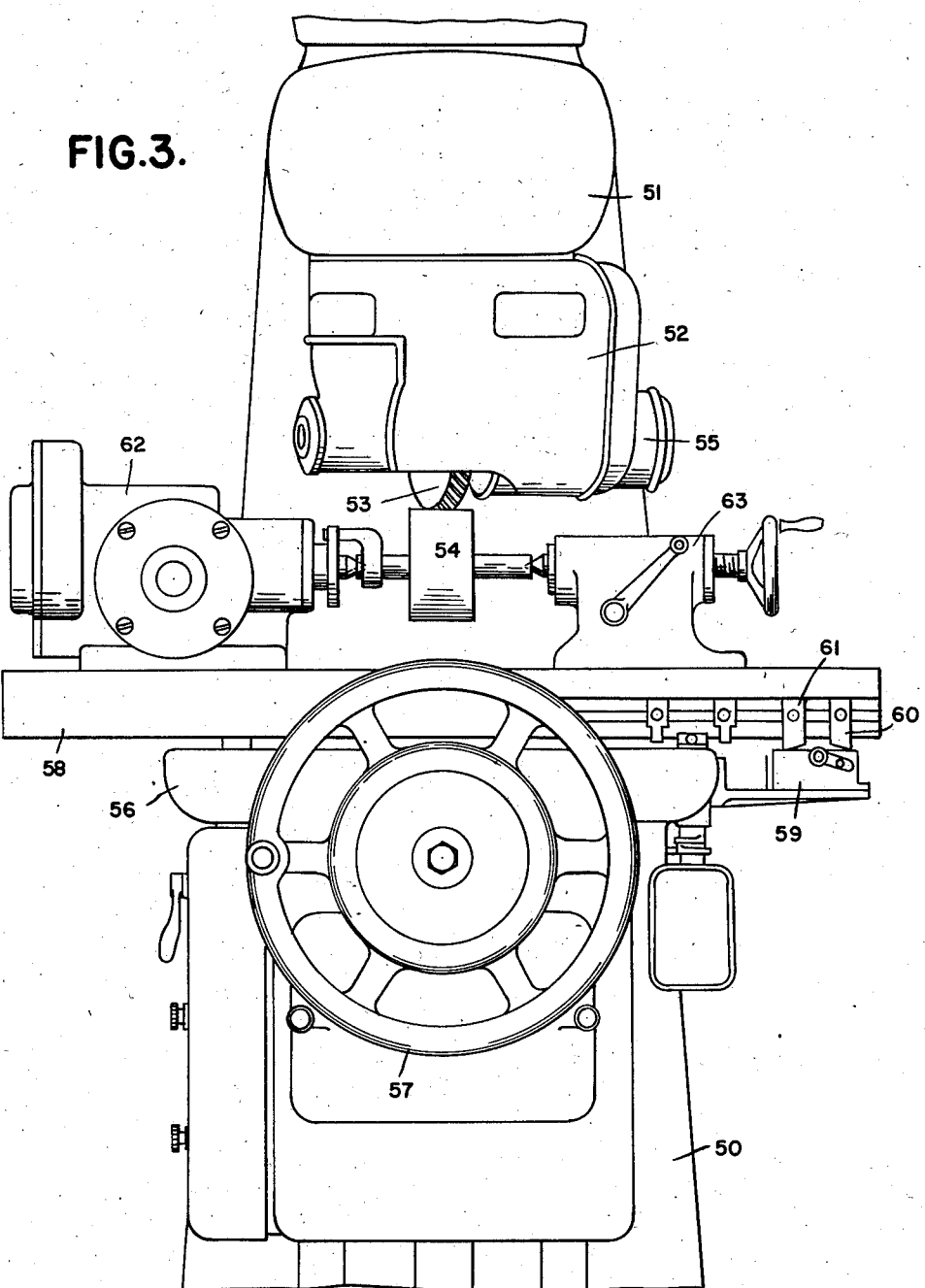

July 23, 1940.  R. S. DRUMMOND  2,208,572
METHOD AND MACHINE FOR FINISHING SURFACES
Filed Aug. 1, 1938  4 Sheets-Sheet 4
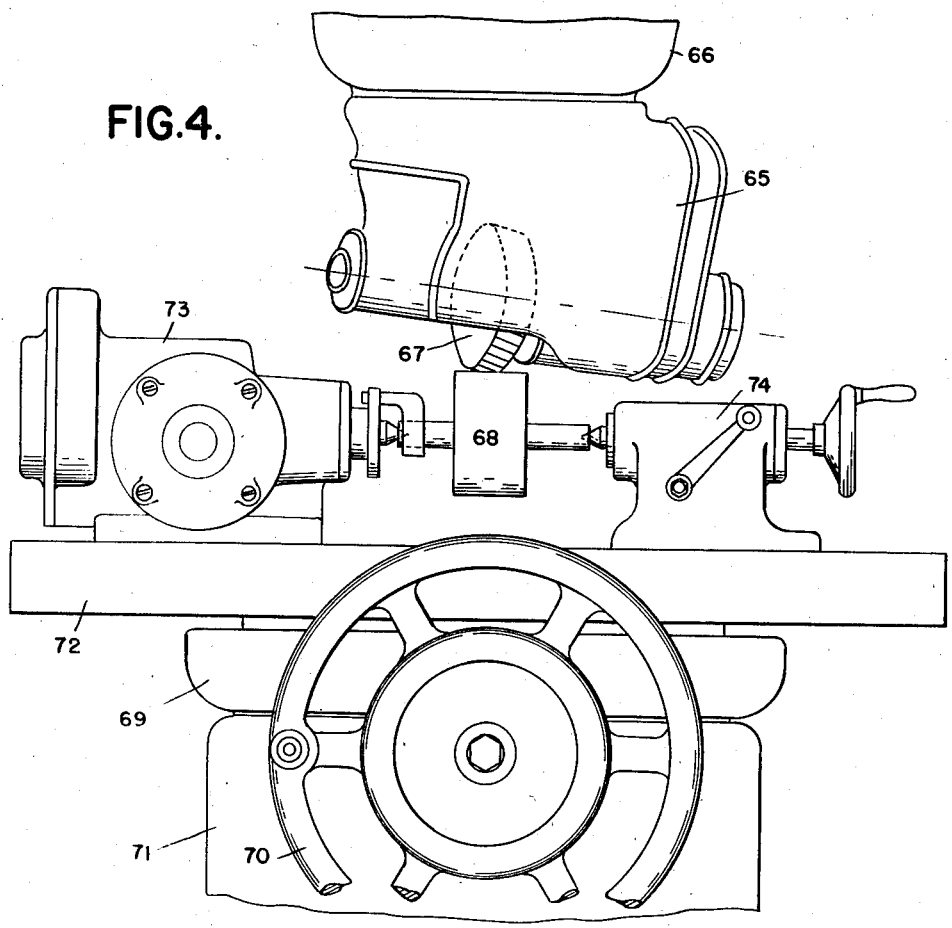
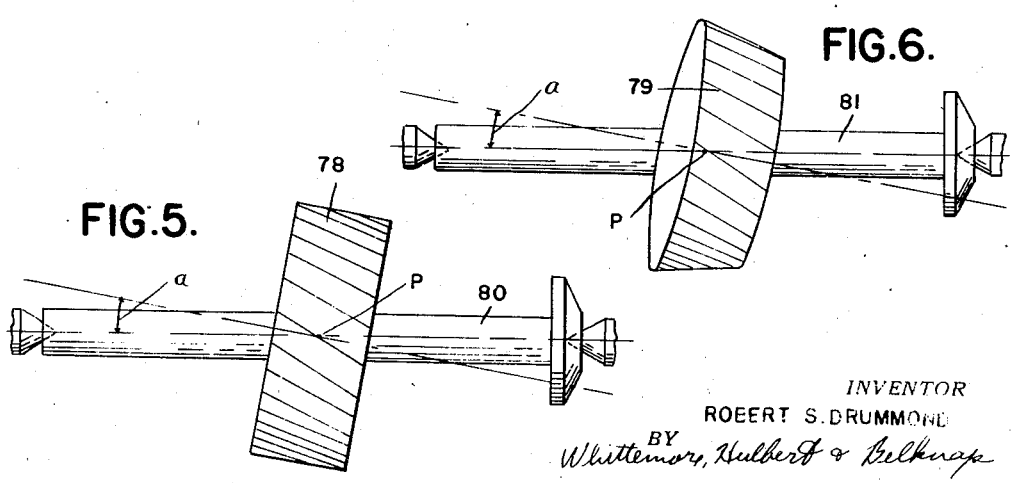
INVENTOR
ROBERT S. DRUMMOND
BY
Whittemore, Hulbert & Belknap
ATTORNEYS

Patented July 23, 1940

2,208,572

UNITED STATES PATENT OFFICE

2,208,572

METHOD AND MACHINE FOR FINISHING SURFACES

Robert S. Drummond, Detroit, Mich., assignor to National Broach & Machine Company, Detroit, Mich., a corporation of Michigan Application August 1, 1938, Serial No. 222,488

14 Claims. (Cl. 90—20)

This invention relates to an improved method and machine for finishing surfaces, and more particularly to a machine for finishing non-planar surfaces of revolution. This application is a continuation-in-part of my copending application entitled "Method of finishing surfaces and machine and cutter therefor," Serial No. 124,790, filed February 8, 1937.

According to the teachings of the present invention, a work piece having a non-planar surface of revolution is adapted to be finished by contacting the same with a rotary cutter, the cutter also having a non-planar surface of revolution. The axis of the cutter and the axis of the work piece are crossed so that the surface of the cutter contacts the surface of the work piece only over a small area. Theoretically, this area of contact between the work piece and the cutter is a point and results from the fact that the contact between the work piece and the cutter is the contact between two curved surfaces. The work piece and the tool are simultaneously rotated. Rotation of the tool without rotation of the work piece would cause a shallow scallop to be cut into the surface of the work piece. When the work piece is rotated simultaneously with the rotation of the tool, this shallow scallop is extended around the surface of the work piece forming a shallow groove therein. Simultaneously with the rotation of the work piece and the rotation of the tool, a further relative movement is introduced between the work piece and the tool in a direction to distribute the cutting action axially of the work piece. This results in the formation of a shallow helical groove around the surface of the work piece. By properly selecting the speed of rotation of the work piece and by proportioning the relative movement between the tool and the work piece thereto, this helical groove will be so formed that adjacent convolutions overlap to a considerable extent. The overlapping of adjacent convolutions of the helical groove will normally be of sufficient extent so that the finished surface is extremely smooth.

The type of cutting performed according to the teachings of this invention is entirely novel and presents a number of decided advantages over methods previously practiced, as will be subsequently pointed out. Accordingly it is an object of the present invention to practice a new method of surface finishing by rotating a work piece having a non-planar surface of revolution in contact with a rotary tool having a working surface defining a non-planar surface of revolution and simultaneously providing a relative movement between the tool and work piece in a direction to distribute a finishing action over the surface to be finished. More specifically, it is an object of the present invention to practice a new method of finishing cylindrical or conical surfaces on a work piece by rotating the work piece about its axis and simultaneously rotating the cylindrical or conical finishing tool in contact with the surface to be finished with the axis of the finishing tool and work piece crossed so as to provide a limited area of contact between the tool and the surface and to introduce a relative movement between the tool and work piece in a direction to distribute the finishing action along the surface to be finished.

It is a further object of the invention to provide a novel machine for practicing the method referred to.

Other objects of the invention will be apparent as the description proceeds and when taken in conjunction with the accompanying drawings, wherein Fig. 1 is a fragmentary plan view of a machine for finishing a surface of revolution in which the tool and the work piece are in substantially line contact;

Fig. 3 is a fragmentary front elevation of a machine illustrating a different embodiment of my invention;

Fig. 4 is a fragmentary front elevation of a machine illustrating a somewhat different embodiment of my invention;

Fig. 5 is a diagrammatic view showing the relationship between the work piece and the tool;

Fig. 6 is a diagrammatic view showing the relationship between a different type of tool and the work piece.

Fig. 7 is a fragmentary section of a work piece.

In its broadest aspects the present invention relates to finishing a non-planar surface of revolution by contacting the same with a rotating cutter with the axis of the cutter and the work piece crossed so that the tool would cut a shallow scallop in the work piece. The work piece is simultaneously rotated so that the shallow scallops are extended about the periphery of the surface, forming a shallow groove therein. Simultaneously with the rotation of both the work piece and the tool, further relative feeding movement is introduced between the work piece and tool which causes the groove to be extended about the work piece in a helical path. The speed of rotation of the work piece and the speeds of relative movement between the work piece and tool is such that adjacent convolutions of the helical groove overlap to a substantial extent.

It will be appreciated that the invention as thus far described may be practiced with a cylindrical tool contacting a cylindrical work piece; with a conical tool contacting a cylindrical work piece; with a cylindrical tool contacting a conical work piece; with a conical tool contacting a conical work piece; or by providing proper guiding means with a tool having a concave or convex working surface contacting a work piece having a concave or convex surface of revolution.

It is an essential consideration in the present method of finishing surfaces that the work piece and tool are in contact only over a limited area. This area may vary from the theoretical point contact to an area of substantial size according to the depth of cut, but in all cases it is substantially less than is encountered in the conventional milling. Due to the relative smallness of the area of contact, the pressure between the work and the tool is substantially reduced and there is a correspondingly reduced tendency for the tool to deform the work while performing its finishing operation.

The shavings removed in this type of cutting are relatively fine hair-like shavings and it has been found that a surface may be finished with great rapidity without generating sufficient heat to discolor the shavings. The type of cutting performance may be compared to fly cutting, and the surface as finished by this type of operation is accurately finished and exhibits almost mirror like appearance.

While this type of surface finishing, as pointed out above, may be practiced with a variety of cutting tools and is applicable to a variety of shapes of surfaces to be finished, for purposes of illustration I have shown the method as practiced with conical and cylindrical cutters and on cylindrical work pieces.

Figure 1:
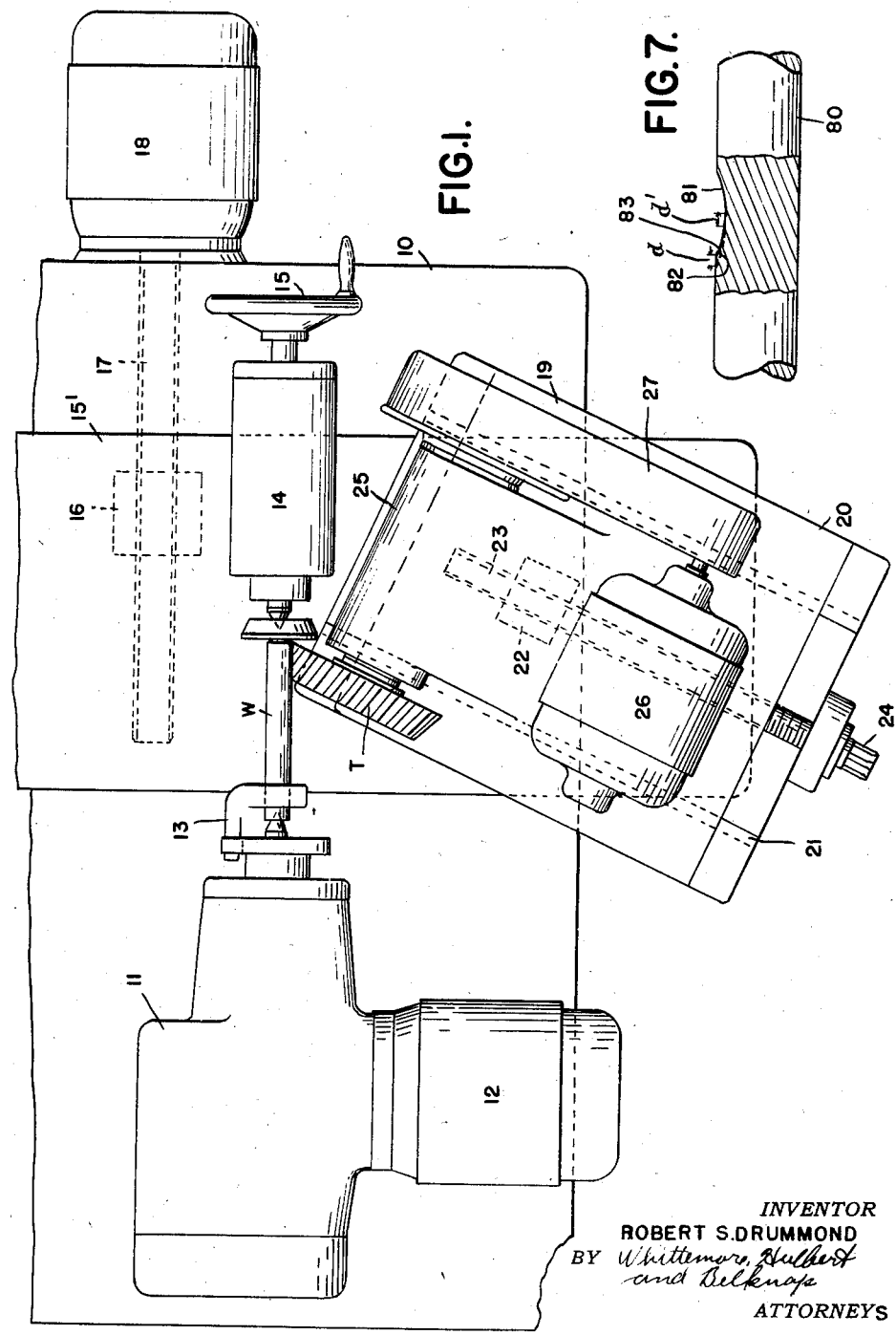

In Fig. 1 I have illustrated for purposes of comparison a machine in which a somewhat different method of finishing surfaces is practiced. This method is further set forth in the parent application referred to above and will be but briefly described here. In Fig. 1 a frame 10 is provided upon which is secured a power head stock 11 driven through suitable gearing by a motor 12. The work piece W is driven from the power head stock by means of a conventional driving fixture 13 and is mounted for rotation between the head stock 11 and a tail stock 14, the latter being provided with a hand wheel 15 for clamping and releasing the work. A carriage 15 is mounted on the table for translation in a direction parallel to the axis of the work piece and suitable means for automatically moving the table 15 are provided. These means take the form of a depending threaded lug 16 carried by the carriage cooperating with a threaded shaft 17 suitably journaled in the frame 10. A motor 18 is adapted to rotate the threaded shaft 17 so as to translate the carriage 15' in a direction parallel to the axis of the work piece W.

A tool support 19 is secured to the carriage 15' and is mounted for adjustment thereon about a vertical axis. Suitable means (not shown) are provided to clamp the support in adjusted position. In this type of machine the finishing tool T is conical and the adjustment of the tool support 19 about a vertical axis is for the purpose of adjusting the tool so that it may contact the work piece in straight line contact.

A tool slide 20 is mounted on the support 19 for adjustment thereon in the ways indicated at 21. The slide 20 carries a depending threaded lug 22 which cooperates with a threaded shaft 23 suitably journaled in the slide 20. The shaft 23 is provided with a squared projecting portion 24 for coaction with a crank or the like to adjust the slide relative to the support.

The tool T is supported by a spindle received in the tool spindle bushing indicated at 25 and is adapted to be driven from the motor 26 by suitable means such as a chain, belt or train of gears received within the protecting housing 27.

In operation, the motors 11 and 26 are simultaneously energized to rotate the work W and the tool T. The motor 18 is also energized and will cause a slow translation of the carriage 15' in the direction of the axis of the work piece. The tool T is fed to depth in the work piece by suitable manipulation of the shaft 23 and subsequent translation of the carriage 15' distributes the finishing action along the surface of the work piece. It will be understood that in this device the tool T simultaneously finishes a band of substantial width about the circumference of the work piece. In order that a cut of this width may be taken, substantial pressure is necessary between the tool and the work piece with the result that the surface as finished may not be entirely smooth.

Figure 2:
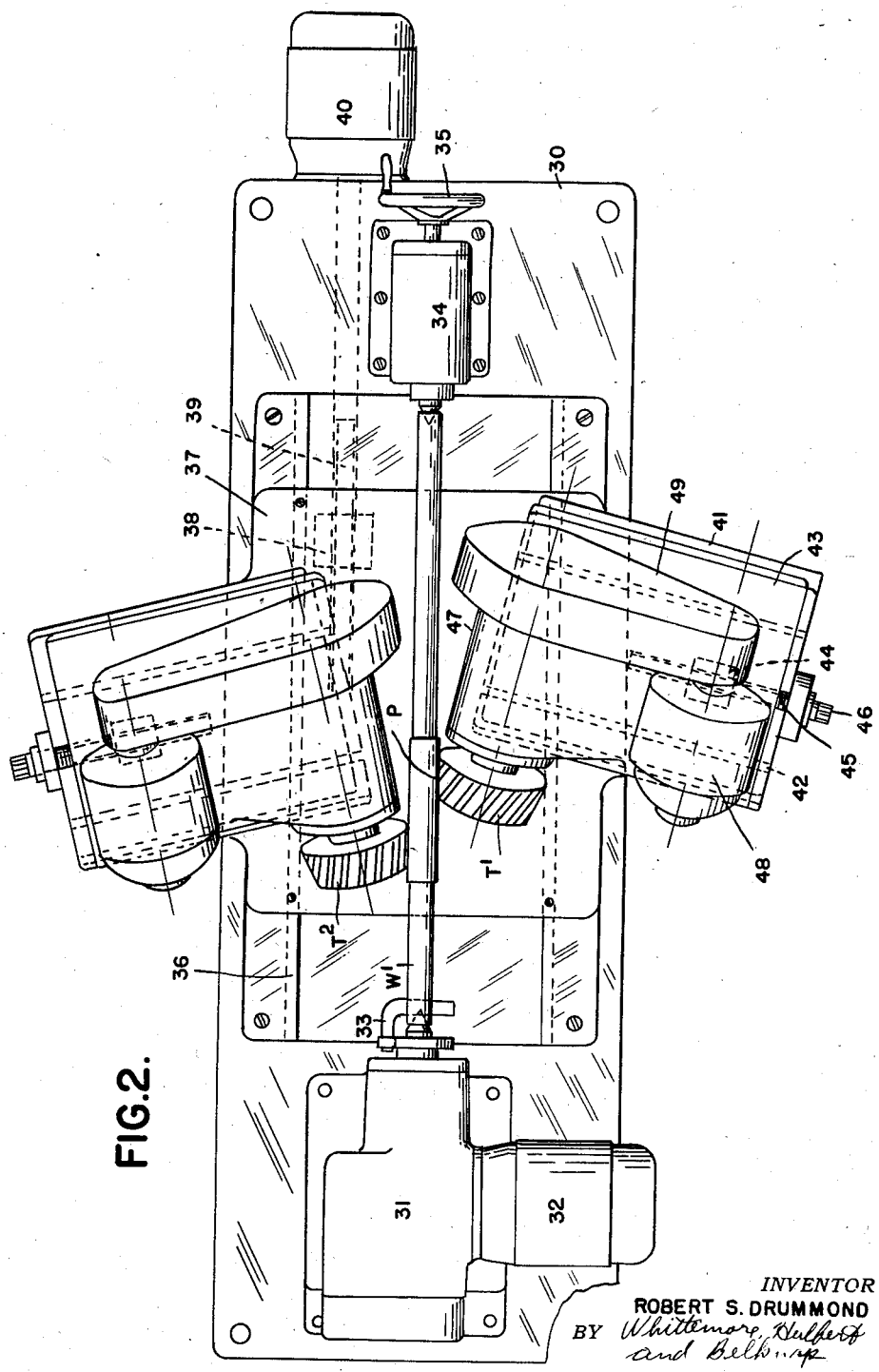
Fig. 2 is a fragmentary plan view of a machine for finishing a surface of revolution in which the finishing tools are in true crossed axes relationship and contact the surface of revolution over a limited area.

A machine illustrated in Fig. 2 is in many respects like that shown in Fig. 1, but operates to perform an entirely different cutting action. In this machine a frame 30 is provided which carries a power head stock 31 driven by the motor 32 and adapted to rotate a work piece W¹ through a conventional driving adapter 33. A tail stock 34 is also carried by the frame and is provided with a hand wheel 35 for clamping and releasing the work piece W¹ in the machine.

Mounted on the frame 30 for translation in a direction parallel to the axis of the work piece, as in suitable ways indicated at 36, is a carriage 37 on which are mounted in the embodiment illustrated, two finishing tools. The carriage 37 is provided with a depending threaded lug 38 which is adapted to cooperate with a threaded shaft 39 suitably journaled in the frame 30 and driven by a motor 40. Rotation of the motor 40, as will be understood, causes a slow translation of the carriage 37 on the frame. Carriage 37 is provided with two tool supports 41. These tool supports are or may be identical, and only two will be described in detail. The support 41 is mounted on the carriage for adjustment about a vertical axis of suitable means (not shown). The carriage 41 is provided with ways 42 in which is mounted a slide 43 which carries the tool and its driving mechanism. The slide 43 is provided with depending lug 44 which is screw threaded to receive a threaded shaft 45, the latter being provided with a squared projecting end 46 for manipulation by a suitable tool. As will be readily understood, rotation of the shaft 45 provides for adjustment of the slide 43 toward and away from the work piece. The tool T' is mounted on a spindle bushing 47 and is adapted to be actuated from motor 48 by suitable driving connections received within a housing 49.

As will be seen from Fig. 2, the axis of the tools T' are in a plane inclined to the horizontal. In addition, since these tools are conical, their axes are further inclined relative to the axis of the work piece in a horizontal direction. Due to the inclination of the axes of the tools from a horizontal plane, the working surface of each tool contacts the axis of the work piece $W^1$ only over a limited area. In order to explain the operation of this machine and the practice of this type of cutting, it may be assumed for the moment that the motors 31 and 40 are stopped and the motor 48 is energized, thus rotating the tool T'. If this tool is adjusted by means of the threaded shaft 45 toward the work piece, it will eventually contact the work piece at a point P. Further feeding of the tool toward the work piece causes the tool to cut into the work piece and form a shallow rounded scallop therein. This scallop, as will be evident, will vary in shape according to the shape and radius of the curvature of the tool, and the amount which the tool is fed into the work piece. If at this time the motor 32 is started, thus rotating the work piece $W^1$, the scallop will be extended circumferentially around the work piece, forming a shallow groove therein, the shape of which will depend upon the considerations previously discussed with reference to the shape of the scallop. If the motor 40 is now energized, resulting in a slow translation of the carriage 37 in a direction parallel to the axis of the work piece, the shallow groove will be extended in a helical path around the work piece. In order to obtain a smooth finish on the work piece it is desirable that adjacent convolutions of the helical groove thus formed overlap by a substantial amount. Normally, the work piece is rotated at a fairly high speed and the rate of translation of the carriage is quite slow so that adjacent convolutions overlap by a very substantial amount. It will be understood, of course, that the relative speed of the work piece and tool will be selected to give a desirable cutting relationship between the tool and the work. The proper rate of translation of the carriage 37 depends primarily upon the rate of rotation of the work piece but also, as will be evident, upon the shape of the individual grooves formed by the tool. The shape of the groove, as previously stated, depends upon a number of considerations and depends also, as will be evident, upon the angular relationship between the axis of the tool and of the work. Thus in order to obtain the rapid removal of metal and at the same time to obtain a smooth finish on the surface of the work piece, it is necessary to correlate the variables referred to. It is impossible, of course, to give a set of rules which will be applicable to all cases but with the foregoing suggestions in mind, those skilled in the art may readily practice the invention.

I have illustrated in Fig. 7 a work piece 80 corresponding to that shown in Fig. 5 with the central portion thereof cut away on a vertical axial section to show the action of the cutting tool when operated with its axis crossed at a limited angle to the axis of the work piece. A tool, such as 78 shown in Fig. 5, cuts a groove in the work shown by the scallop 81 in Fig. 7. The groove is of shallow depth and of considerable extent. Furthermore, this scallop in the sectional view shown in Fig. 7 has a curve which is formed by the intersection of a plane and a cylinder or cone (according to the type of tool used) at a limited angle to the axis of the cylinder. It is, therefore, practically flat at its bottom for a substantial distance.

It will be understood that this scallop, due to the rotation of the work piece, is a section of a groove formed about the work piece. In order to finish the surface of the work piece, the relative feeding motion is introduced between the tool and a work piece which will result in distribution of the cut along the work piece. This may be done by relatively translating the tool and work piece in the direction of the axis of the work piece or transverse thereto under proper conditions. In either case I have illustrated in Fig. 7 the conditions which result from the feeding motion referred to. The dotted line 82 indicates on an exaggerated scale the next successive cut taken after the initial cut 81. It will be observed that the relative feed is an amount $d$ and that a substantial amount of material indicated generally at 83 is removed from the work piece at the end of the cut. This amount of feed results in a shifting of the low portion of the cut by a distance $d'$ in which $d'$ of course is the same distance as $d$ referred to above. However, it will be noted that the amount of material removed at the bottom of the cut is very small.

The result of this is that after the tool is fed relative to the work, material 83 is removed by preliminary rough cuts away from the center of crossed axis and that adjacent the center of crossed axis the work piece is accurately finished by cuts of exceedingly fine nature. Therefore, the work piece is finished to a very high degree of accuracy. In practice it has been found that the finish imparted is substantially a mirror finish.

In the machine shown in Fig. 2, I have illustrated a pair of cutters operating on opposite sides of the work piece. These cutters may be employed in various relationships, some of which will be pointed out. The cutter $T^1$ may be set so as to take a cut of predetermined cut on the work piece and the cutter $T^1$ may be set only very slightly in advance of the cutter $T^2$ so that the cutter $T^1$ in effect acts as a roughing cutter and the cutter $T^2$ acts as a final finishing cutter. By employing the cutters in this manner, a superior finish may be obtained. On the other hand the cutters $T^1$ and $T^2$ may be set to take a cut of the same depth which will result in substantially more metal being removed in a single pass at the sacrifice of the smoothness of the finished surface.

I have illustrated in Fig. 3, a machine adapted to carry out the method disclosed herein, and in this figure a frame 50 is provided with an overhanging and, in this figure, forwardly projecting head 51 which carries a tool support 52. The tool support 52 is mounted for a swivel adjustment about a vertical axis on the head 51 for the purpose of changing the crossed axis setting of the tool 53 relative to the work 54. A motor 55 is carried by the tool support 52 and is adapted to rotate the tool 53. Mounted in vertical ways (not shown) to the frame 50 is a vertically adjustable table 56. This table may be vertically adjusted as by a suitable jack screw (not shown) adapted to be actuated by the hand wheel 57. Any conventional means of raising and lowering the table may be provided. Mounted in suitable ways on the table 56 is a carriage 58 which is adapted to be reciprocated horizontally and from right to left as seen in Fig. 3. Suitable automatic mechanism is preferably provided for reciprocating the carriage and this may take the form of a depending lug and threaded shaft corresponding to the lug 16 and the shaft 17 shown in Fig. 1. A motor may be provided for rotating the shaft and this motor may be actuated by a reversing switch 59. A pair of adjustable projections 60 and 61 may be mounted on the carriage and this will reverse the rotation of the motor controlling the translation of the carriage 58 and will result in alternate translation or reciprocation of the carriage 58. The carriage is adapted to support the work piece 54 between a power head stock 62 and tail stock 63.

In the embodiment illustrated, both the work piece 54 and the tool 53 are cylindrical, and due to the crossed axes relationship, the contact between the work piece and the tool will be over a very small area, depending upon the amount which the table 56 is elevated. As the table 56 is elevated, the tool 53 and the work piece 54 come into contact. If the tool 53 is at this time rotating, further elevation of the table 56 causes a shallow scallop to be cut in the surface of the work piece 34. Upon rotation of the work piece, this scallop will be extended about the periphery of the work piece to form a shallow groove therein. Slow translation of the carriage 58 simultaneously with the rotation of both tool and work piece will result in a shallow helical groove being formed about the work piece.

As in the discussion of the operation of the mechanism illustrated in Fig. 2, the shape of the groove cut about the work piece will depend upon the shape and radius of curvature of the cutter; the shape and radius of curvature of the work piece; the angle at which the axes of the cutter and work piece are crossed, and the depth to which the tool is fed into the work piece. In this case as in the case previously discussed, the work piece and the tool will be rotated at speeds which result in a desirable cutting relationship between the tool and the work. Depending upon these variables, the carriage 58 is translated relatively slowly during the rotation of the tool and work, the rate of translation being such that adjacent convolutions of the helical groove overlap to an extent which insures accurate finish being imparted to the work piece.

The method as practiced may be varied by a number of additional steps such for example as elevating the work piece by predetermined amounts at the end of each reciprocation, until the work piece is cut to substantially the desired size, after which a number of finishing passes may be made without further feeding.

As in the preceding example, the finish imparted to the work piece will be exceedingly fine, for the reason that the cutting is performed at low tool pressure and at relatively high speed.

I have illustrated a somewhat different embodiment of my machine in Fig. 4. In this figure the parts in operation correspond exactly to the machine illustrated in Fig. 3, with the exception that the tool support 65 which is mounted on the head 66 for swivel adjustment about a vertical axis, is arranged to support the cutter 67 with its axis inclined to a horizontal plane. This is for the reason that the cutter 67 as illustrated in this figure is a conical cutter and is adapted in this instance to work on a cylindrical work piece 68. It will be understood that the axis of the tool is inclined to the axis of the work piece at an angle which is made up of two angular differences. In the first place, since the tool as illustrated in this figure is a conical cutter and since the axis of the work piece is shown as horizontal, it is necessary to incline the axis of the cutter from a horizontal plane by an angle equal to half the vertex angle of the cone. This angular adjustment, if none other were made and if the axis of the work piece and the cutter were co-planar, would result in line contact between the cutter and the work piece. However, the present method of cutting depends upon this line contact being supplanted by a contact of limited area. Therefore, in order to carry out the present invention, it is necessary for the swivel head 65 to be rotated about a vertical axis by an amount necessary to bring about the desired type of contact between the tool and the work.

In this machine a vertically adjustable table 69 is provided and means actuated by a hand wheel 70 interconnect the support 71 and the table 69 for elevating the table. A horizontally reciprocable carriage 72 is provided on the table and as in the embodiment illustrated in Fig. 3, it is contemplated that automatic means will be provided to reciprocate the carriage in a horizontal plane. The work piece 68 is adapted to be rotated by a power head stock 73, being mounted for this purpose between the head stock and a releasable tail stock 74.

In the machines illustrated, the means for distributing the cutting action across the surface of the work piece have in each case been shown as means for producing relative reciprocation in the direction of the axis of the work piece. It will be understood, however, that relative motion need not be limited to this direction. In Figs. 5 and 6 I have illustrated diagrammatically the relationship between a cylindrical cutter 78 and a cylindrical work piece 80 and a conical cutter 79 and a cylindrical work piece 81, respectively. In both cases due to the crossed axes relationship indicated between angle a, the cutter and work piece when relatively moved towards each other, come into contact first at a point P directly beneath the center of crossed axes as indicated in Figs. 5 and 6. Further feeding movement bringing the cutters and tools closer together, results in the formation of a shallow scallop and rotation at this time of the work pieces 80 or 81 causes a shallow groove to be cut circumferentially around the work pieces. In order to distribute the cutting action across the surface to be finished as previously stated, a relative motion must be introduced between the work piece and tool. For simplicity in the machines previously described in detail, this relative motion is in the direction of the axis of the work piece. However, that this relative motion need not be so limited will be apparent.

Considering first Fig. 5, it will be apparent that bodily motion of the cutter 78 in a direction perpendicular to the axis of the work piece 80 will cause the finishing action of the cutter to be distributed along the axis of the cutter. This is for the reason that the finishing action is limited to a zone as seen in Fig. 5 directly beneath the center of crossed axes and as the axis of the cutter is moved upwardly, seen in this figure, the center of crossed axes will shift to the right. Following this explanation further, it will be seen that relative movement between the cutter and the work piece in any direction other than parallel to the axis of the cutter will result in some distribution of the finishing action along the work. Where the relative reciprocation between the parts is in the direction of the axis of the work, it will be apparent that only a narrow zone around the cutter will come into action. If, on the other hand, the direction of relative motion between the cutter and the work is in any direction other than parallel to the axis of the work or parallel to the axis of the cutter, the distribution of the finishing action axially of the work will be accomplished by a corresponding distribution across the face of the tool. In many cases this is a desirable feature, since it prevents localized wear on the tool and this non-parallel relative motion may be advantageously employed to increase tool life.

In the case illustrated in Fig. 5, when both the work piece and the cutter are cylindrical, the only requirement regarding relative motion between the cutter and the work piece is that such relative motion be caused by moving one member in a plane which is parallel to the axis of the other. As a matter of fact, this limitation is a practical consideration only since it is apparent that distribution of the finishing action could be accomplished by moving the cutter or the tool in a curved path about the axis of the other. While this last is theoretically possible, it offers no practical advantages and the disadvantages of constructing the machine to provide such motions are obvious.

In connection with the diagram shown in Fig. 6, the same consideration as previously discussed applies, except that since the axis of the cutter is inclined to the axis of the work by an additional amount to compensate for the cone angle of the cutter, the relative motion between the parts may not be defined as simply produced by moving one of the parts parallel to the axis of the other. The finishing action may be distributed along the work piece by moving the cutter in a plane parallel to the axis of the work, and this motion may be in the direction of the axis of the work or pendicular to the axis of the work, or in fact any direction other than parallel to the axis of the cutter. This same relative motion may, of course, be produced by moving the work in the same direction.

It will be apparent that the same method of cutting may be employed to cut a conical part, the only change being that the direction of relative motion between the work piece and tool shall be such that the finishing action is distributed uniformly over the work piece. Similarly, the same method of cutting may be employed in cutting the work piece having a surface of revolution generated by the curved line and this will be true, whether the surface of revolution is concave or convex. It is only necessary that the dimensions of the cutter be chosen so that they may follow the desired contour without interference.

In all cases the same essential relationship exists, that is, a rotary cutter contacting a rotating work piece with their axes so arranged that the contact between the two is limited to a relatively small area and a relative motion is introduced between the two such that the finishing action is distributed uniformly across the surface of the work piece.

I have found that by employing the present type of cutting it is possible to take a much greater depth of cut and the work produced by this method is characterized by its particularly excellent finish.

As indicated diagrammatically in various figures, the cutters are provided with helically arranged cutting edges, although in this type of work this is by no means essential.

It is further possible to finish a work piece such as shown in Fig. 5, for example, by employing a rotary cutter having a concaved working surface. If the concavity is selected relative to the diameter and cross axial relationship such that the cutter effectively envelops the work piece from side to side of the cutter, the benefits of my improved type of cutting disappear. However, if the concavity of the tool is described from a greater radius so that while the area of contact is somewhat enlarged, it still remains relatively small, the same advantages previously pointed out are inherent.

The foregoing detailed description has been given for clearness of understanding only, and no unnecessary limitations should be understood therefrom, but the appended claims should be construed as broadly as permissible in view of the prior art.

What I claim as my invention is:

1. The method of finishing a work piece having a circular cross-section surface of revolution comprising rotating said work piece in contact with a rotary tool with the axes of said work piece and tool non-intersecting and crossed, relatively moving said tool and work piece in a direction to distribute the finishing action over the surface of said work piece, while maintaining the axes of said tool and work piece rigidly spaced.

2. The method of finishing a work piece having a circular cross-section surface of revolution comprising rotating said work piece in contact with a rotary tool with the axes of said work piece and tool non-intersecting and crossed, relatively reciprocating said tool and work piece in a direction to distribute the finishing action over the surface of said work piece, while maintaining the axes of said tool and work piece rigidly spaced, and feeding said tool and work piece together at the end of each reciprocation by a predetermined increment.

3. The method of finishing a work piece having a circular cross-section surface of revolution comprising rotating said work piece in contact with a rotary tool with the axes of said work piece and tool non-intersecting and crossed, relatively moving said tool and work piece in a plane parallel to the plane tangent to the surface of the work piece at the point of finishing.

4. The method of finishing a work piece having a non-planar surface of revolution generated by rotating a straight line about an axis coplanar with said line, comprising providing a tool having a cutting surface defining a non-planar surface of revolution generated by rotating a straight line about an axis coplanar with said line, positioning said tool and work piece in contact with their axes non-intersecting and crossed, rotating said tool and work piece, and relatively moving said tool and work piece in a direction to distribute the cutting action over the surface of said work piece.

5. The method of finishing a work piece having a circular cross-section surface of revolution providing a rotary tool having a working surface defining a circular cross-section surface of revolution, positioning said tool and work piece in contact at crossed, non-intersecting axes and rotating said tool so that said tool is adapted to cut a small scallop in the surface of said work piece, rotating said work piece so that a shallow groove is cut around said work piece, and simultaneously relatively moving said tool and work piece so that the finishing action is distributed along the surface of said work piece.

6. The method of finishing a work piece having a circular cross-section surface of revolution providing a rotary tool having a working surface defining a circular cross-section surface of revolution, positioning said tool and work piece in contact at crossed non-intersecting axes and rotating said tool so that said tool is adapted to cut a small scallop in the surface of said work piece, rotating said work piece so that a shallow groove is cut around said work piece, and simultaneously relatively moving said tool and work piece so that said groove is formed spirally along said work piece, the rate of rotation of said work piece being so proportioned to said relative movement that the convolutions of said groove overlap.

7. The method of finishing a work piece having a convex surface of revolution comprising contacting said surface with a rotary tool having a convex finishing surface with the axes of said tool and work non-intersecting and crossed at an angle such that said tool and work contact only over a limited area, rotating said tool and work, and relatively moving said tool and work so that said area is distributed along said work in an overlapping helix.

8. The method of finishing a work piece having a surface of revolution which comprises: rotating the work piece, rotating a tool having a working surface of revolution in contact with the work piece with their axes non-intersecting and crossed at a limited angle, and relatively feeding said tool and work piece to distribute the finishing action along said work piece so as to take roughing cuts followed by finishing cuts on the work piece.

9. The method of finishing a cylindrical work piece with a cylindrical tool, which comprises positioning said tool in contact with said work with their axes in spaced parallel planes, and inclined to each other in said parallel planes at a limited angle, rotating said tool and work independently, and relatively feeding said tool and work in a plane parallel to the axes of both tool and work.

10. The method of finishing a cylindrical work piece with a conical tool, which comprises contacting said work and tool with their axes related in a compound angle made up of an inclination in the plane of the axis of the work equal to substantially half the vertex angle of the conical cutter, and a limited inclination in a plane perpendicular to said first plane, rotating said tool and work and relatively feeding said tool and work along the work.

11. The method of finishing a work piece having a surface of revoluion generated by a straight line element, with a rotary cutter having a working surface of revolution generated by a straight line element, which comprises contacting said surfaces such that said straight line elements thereof at the zone of contact are crossed at a limited angle, rotating said tool and work, and relatively feeding said tool and work along said work.

12. The method of finishing a work piece having a circular cross-section surface of revolution, with a rotary tool having a circular cross-section surface of revolution, which comprises rotating said tool and work in surface contact with their axes non-intersecting and angularly related so that the instantaneous direction of motion of said surfaces at the zone of contact are along lines which diverge by a limited angle.

13. The method of finishing a work piece having a circular cross-section surface of revolution, with a rotary tool having a circular cross-section surface of revolution, which comprises rotating said tool and work in surface contact with their axes non-intersecting and angularly related so that said tool removes metal around said work in the form of a relatively wide, very shallow curved groove, and relatively feeding said tool and work in a direction along said work to form said groove as a substantially overlapping helix.

14. A machine for finishing a work piece having a surface of revolution which comprises means for rotating a work piece about its axis, means for rotating a rotary cutter in contact with the surface of said work, with the axes of said cutter and work in no common plane and crossed at a limited angle, and means for relatively moving said cutter and work to distribute said cut along the work.

ROBERT S. DRUMMOND.